Figure 1:
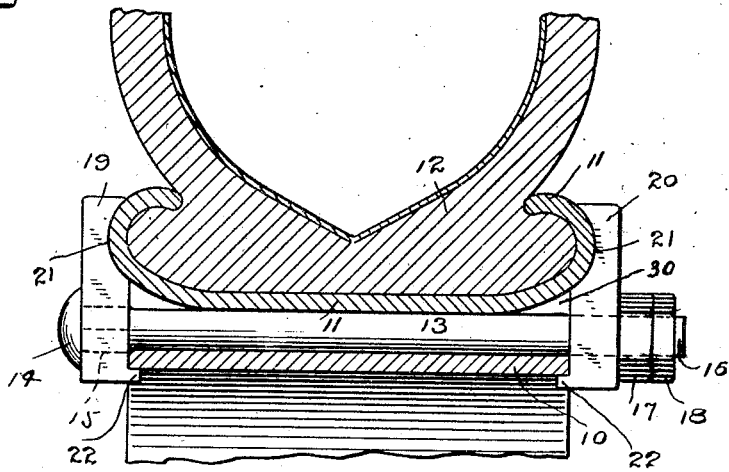

H. H. FORD.
MEANS FOR ATTACHING DEMOUNTABLE RIMS.
APPLICATION FILED AUG. 17, 1908.

940,243.

Patented Nov. 16, 1909.

2 SHEETS—SHEET 1.

Witnesses:
H. A. Lamb.
S. W. Atherton.

Inventor
Harry H. Ford
By Attorney
N. M. Wooster

UNITED STATES PATENT OFFICE.

HARRY H. FORD, OF BRIDGEPORT, CONNECTICUT, ASSIGNOR OF ONE-HALF TO HARRY H. DE LOSS, OF BRIDGEPORT, CONNECTICUT.

MEANS FOR ATTACHING DEMOUNTABLE RIMS.

940,243.     Specification of Letters Patent.     Patented Nov. 16, 1909.

Application filed August 17, 1908. Serial No. 448,823.

*To all whom it may concern:*

Be it known that I, HARRY H. FORD, a citizen of the United States, residing at Bridgeport, county of Fairfield, State of Connecticut, have invented a new and useful Means for Attaching Demountable Rims, of which the following is a specification.

This invention relates to the class of vehicle wheels, more especially automobile wheels, which are adapted to use demountable tires, that is tires which may be carried already inflated and attached to tire rims so that should a tire give out in use the tire rim and tire may be readily removed from the rim of the wheel and a new tire already inflated and attached to another tire rim may be substituted in its place, thus making the task of replacing a tire on the road a simple operation and one that can be quickly performed by any person not necessarily a mechanic and without the use of special tools.

The present invention has for its objects to provide simple and inexpensive means for detachably securing tire rims to any wheels having metallic rims and to provide an open air space between the tire rim and the wheel rim for the purposes of keeping the tire rim and tire cool, of preventing the tire rim from becoming set on the wheel rim by oxidation and of permitting an ordinary standard valve stem to be inserted in and withdrawn from the hole in the wheel rim and felly in mounting or demounting a tire without danger of injury to the valve stem.

With these and other objects in view I have devised the novel tire rim attaching means, of which the following description in connection with the accompanying drawings is a specification, reference characters being used to indicate the several parts.

Figure 2:
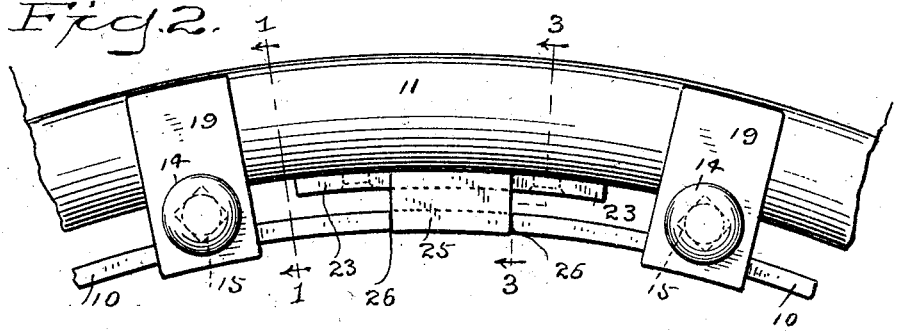
Figure 3:
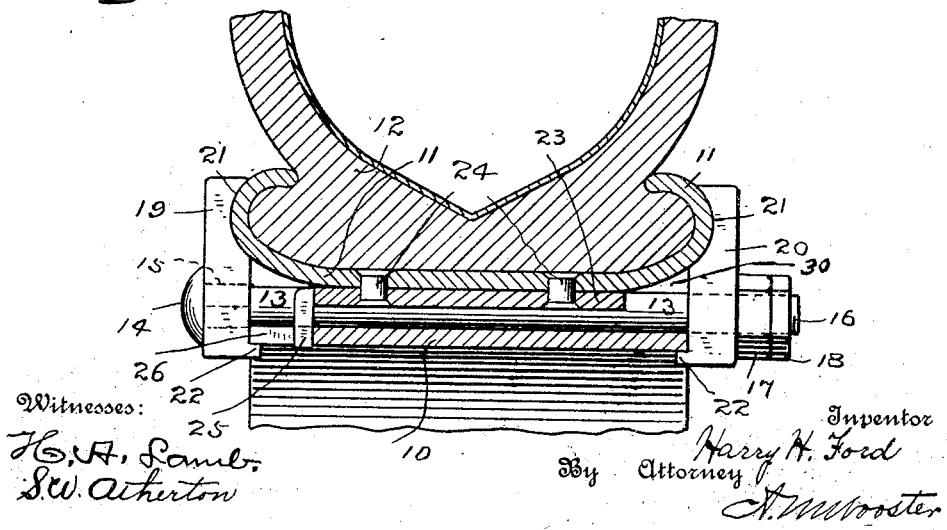
Figure 4:
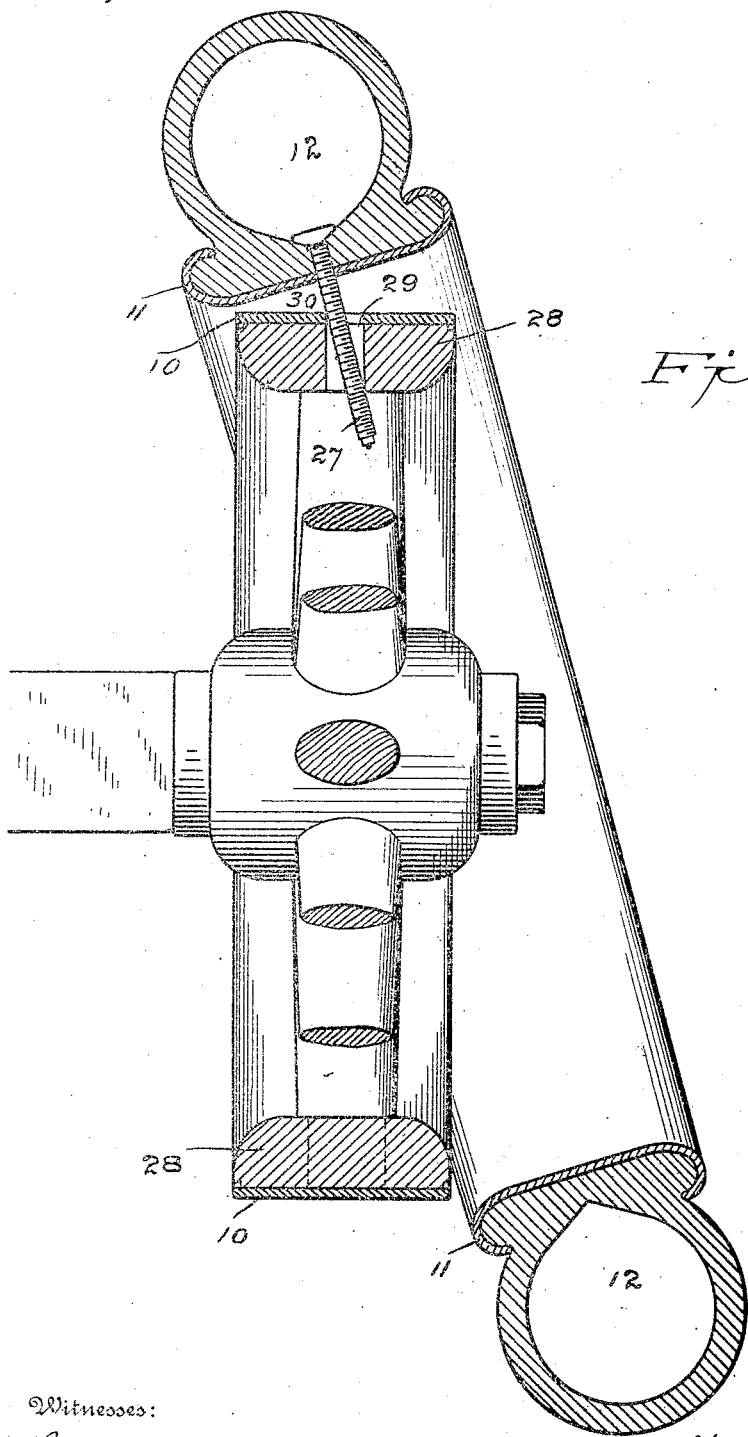

Figure 1 is a view partly in section on the line 1—1 in Fig. 2 looking in the direction of the arrows, and partly in elevation, illustrating my novel means for attaching a tire rim to the rim of a wheel; Fig. 2 a side elevation corresponding therewith; Fig. 3 a section on the line 3—3 in Fig. 2 looking in the direction of the arrows, illustrating means for preventing the tire rim from creeping on the wheel rim; and Fig. 4 is a sectional view illustrating the operation of mounting or demounting a tire rim and tire, the bolts and clamps being removed.

10 denotes the rim of an automobile wheel, 11 a tire rim of appreciably greater diameter than the wheel rim and 12 a tire. I have illustrated the application of the invention in connection with the well known clencher tire rim, so called. It should be understood, however, that the special form of wheel rim and the special make of tire rim are wholly immaterial so far as the present invention is concerned.

My novel attaching means consists simply of a plurality of bolts, for example ordinary carriage bolts, lying between the rims and two specially formed clamps carried by each bolt which are adapted to engage both the tire rim and the wheel rim and secure said rims together with an air space between them.

13 denotes the bolts which are shown as provided with rounded heads 14, are preferably made angular under the heads, as at 15, to prevent them from turning and are threaded at the opposite ends, as at 16.

17 denotes a nut and 18 a lock nut to retain the parts locked in place in use.

19 and 20 denote the clamps, one of which may be made integral with the bolt if preferred. In the drawings I have shown the clamps as made separate from the bolt, one clamp in each pair being provided with an angular opening to receive the angular portion of the bolt under the head and the other with a hole through which the bolt passes. Each clamp is provided in its inner face with a socket 21 which is shaped to receive the outer face of the tire rim and engage it securely. The lower ends of the clamps are provided with inwardly extending lips 22 which pass under and firmly engage the rim of the wheel.

27 (see Fig. 4) denotes the valve stem, 28 the felly and 29 the hole in the felly and wheel rim for the insertion and withdrawal of the valve stem.

It will be seen from the drawings that the clamps rigidly hold the tire rim at an appreciable distance from the wheel rim leaving a circular air space between said rims which is indicated by 30 and in which the bolts lie. This air space between the tire rim and the wheel rim is a matter of vital importance as it acts to a marked degree to cool the tire rim and the tire, the rotation of the wheel causing a constant circulation of air between the two rims. Another important advantage resulting from rigidly securing the tire rim out of contact with the wheel rim is that all danger of the two rims becoming set together by oxidation is avoided. And a third important advantage resulting from providing an appreciable space between the rims is that in demounting a tire it permits the portion of the tire rim and tire opposite to the valve stem to be swung forward, as clearly shown in Fig. 4, after which the tire rim and tire may be raised and the valve stem drawn out of the hole in the wheel rim and felly without the slightest difficulty. The same advantage results in mounting a new tire rim and tire.

The operation will be obvious from the drawings. The tire rim is placed over the wheel rim and a plurality of bolts passes between them, clamps provided with angular openings having first been placed upon the bolts. The sockets are then placed in engagement with the face of the tire rim and the lips under and in engagement with the wheel rim. The other clamps are then passed over the threaded ends of the bolts, the sockets receiving the other face of the tire rim and the lips passing under and engaging the other edge of the wheel rim. The two rims are then rigidly secured together with the air space between them by means of the nuts.

In order to prevent the possibility of the tire rim and tire creeping or sliding upon the wheel rim, I provide suitable means for locking the tire rim against longitudinal movement. This may be accomplished in any suitable manner. In the present instance I have shown a plate 23 which is secured to the inner wall of the tire rim by rivets as at 24. This plate is provided on one or both sides with a lip 25 which engages a recess 26 in the edge of the wheel rim, thus rendering it impossible for the tire rim to move longitudinally independently of the rim of the wheel.

Having thus described my invention, I claim:

The combination with a wheel rim and a tire rim of appreciably greater diameter than the wheel rim, of a plurality of bolts lying between said rims, and clamps on said bolts which engage said rims respectively and secure them rigidly, to each other, the clamps having inwardly extending lips engaging under the wheel rim and having portions engaging both inner and outer portions of the tire rim to hold the tire rim spaced from the wheel rim.

In testimony whereof I affix my signature, in presence of two witnesses.

HARRY H. FORD.

Witnesses:
A. M. WOOSTER,
S. W. ATHERTON.